THIN FILM MICROWAVE ABSORPTION STRUCTURE

Filed Aug. 4, 1966 2 Sheets-Sheet 1

INVENTOR
RODGER L. GAMBLIN
BY Ronald J. Clark
ATTORNEY

Sept. 9, 1969 R. L. GAMBLIN 3,466,634

THIN FILM MICROWAVE ABSORPTION STRUCTURE

Filed Aug. 4, 1966 2 Sheets-Sheet 2

United States Patent Office 3,466,634

Patented Sept. 9, 1969

3,466,634

THIN FILM MICROWAVE ABSORPTION STRUCTURE

Rodger L. Gamblin, Vestal, N.Y., assignor to International Business Machines Corporation, Armonk, N.Y., a corporation of New York Filed Aug. 4, 1966, Ser. No. 570,366
Int. Cl. G11c *11/14, 7/00*
U.S. Cl. 340—174 4 Claims

ABSTRACT OF THE DISCLOSURE

A thin film magnetic storage element surrounds a sense line. The magnetic state of the element is sensed by means of microwave energy transmitted down the sense line. The microwave energy absorbed by the element is a function of its magnetic state.

The present invention relates to thin film devices and, more particularly, to a magnetic thin film memory operating in the nondestructive readout mode by the microwave absorption technique.

Thin film magnetic devices for use in memories are found in the existing literature. Furthermore, references exist whereby microwave absorption is shown existing in thin film devices. However, the present device is an improvement thereover insofar as it possesses operating characteristics vastly superior to the prior art devices. These operating characteristics are indirectly attributable to the novel arrangement of the thin film device, its sense, and perturb lines wherein the magnitude of the readout pulse is a function of the input magnitude as opposed to the energy which can be generated by a switching of the thin film device.

The energy relationship in the magnetic field in a thin magnetic film changes with the thin dimension until at some thickness the film tends to form one stable large domain. If there is some anisotropy in the film, the magnetization lies in the film so as to line up with this anisotropy magnetization. There are two stable states for the magnetization along the anisotropy direction, and a square hysteresis loop characterizes the transition from one state to the other. Anisotropy of a film is purposely added to the film at the time of manufacture by plating or evaporation in a magnetic field. The direction of anisotropy is called the easy axis and the direction perpendicular to it is called the hard axis. The hysteresis loop for magnetization along the hard axis is not square and, in general, the magnetization in a film points toward the hard axis only under the action of an external field. With present thin film memories, readout is accomplished by driving the magnetization of the field by some mechanism into the hard axis direction and observing the resulting signal on a pickup line along the hard axis. These signals are weak and difficult to detect since they represent the energy transfer resulting from the switching from one stable state to the remaining stable state or relaxation into a stable state of a film device, which comprises $10^{-3}$ cm. of film surface area.

Accordingly, it is an object of the present invention to provide a thin film microwave structure having an improved readout signal intensity which is relatively strong and easy to detect.

It is a further object of the instant invention to provide a thin film microwave absorption structure whereby the readout signals are a function of the input signal intensity and the time during which the input signal is applied to the thin film structure.

It is another object of the instant invention to provide a thin film microwave absorption memory utilizing thin film devices employing a closed hard axis memory structure.

It is still a further object of the instant invention to provide a thin film microwave absorption structure wherein its associated sense and perturb lines are placed in relationship to the thin film structure in such a manner that the magnetic field of an RF signal propagating down the sense line is perpendicular to the easy axis of the thin film structure. Perturb lines are placed perpendicular to the RF sense line in such a manner that the magnetic field existing around a selected perturb line, through energization thereof by applying a current pulse thereto, is parallel to the easy axis of the film causing a relative increase or decrease in the amount of RF energy passing down the sense line depending on whether the magnetization vector stored in the film is aligned or opposed to the magnetic field generated by a pulse on the perturb line.

It is another object of the instant invention to arrange a plurality of improved thin film microwave structures into a multidimension memory array.

These and other objects of the instant invention are achieved through the use of a multibit sense line having a main connection link with a source of microwave power and a plurality of bit sense lines connected in parallel with the main connection link. Surrounding each of the bit sense lines is a thin film of permalloy which has its easy axis adjusted to coincide with the long direction of the bit path. The magnetic field of the RF signal generated by the microwave source is perpendicular to the easy axis of the permalloy and because the frequency of the signal selected is partially in resonance with the electrons in the film, the RF signal is partially absorbed in the film. The amount of the RF signal, which is ultimately transmitted along the bit paths, is detected and amplified in a plurality of sense amplifiers, one of which is at the termination of each bit path. A plurality of perturb lines are placed perpendicular to the bit paths and extend over a plurality of these lines in such a manner that one perturb line defines a word of storage. Each perturb line is connected to a word driver which generates a relatively narrow width perturber pulse. When this word driver is energized, it causes a magnetic field to exist, which is parallel to the easy axis of the film. This field causes an increase in absorption if it is aligned with the magnetization vector stored in the film or a decrease in absorption if it is opposed to the magnetization vector stored in the film. When a word driver is energized, the detectors and amplifiers associated therewith, through the effect of its associated perturb line, receive more or less voltage down the bit lines depending upon the state of magnetization of the film at the intersections of a perturb line and the bit lines. The increase or decrease in the amplitude of the RF signal travelling down the bit line indicates the storage of a binary 1 or 0 in the film, respectively. A suitable write mechanism for use with the instant invention is disclosed by R. L. Gamblin et al. in their copending U.S. patent application Ser. No. 570,369, and assigned to the assignee of the present invention.

The foregoing and other objects, features and advantages of the invention will be apparent from the following more particular description of a preferred embodiment of the invention, as illustrated in the accompanying drawings; wherein FIG. 1 is a sectional view of a single microwave thin film memory element;

Figure 8:
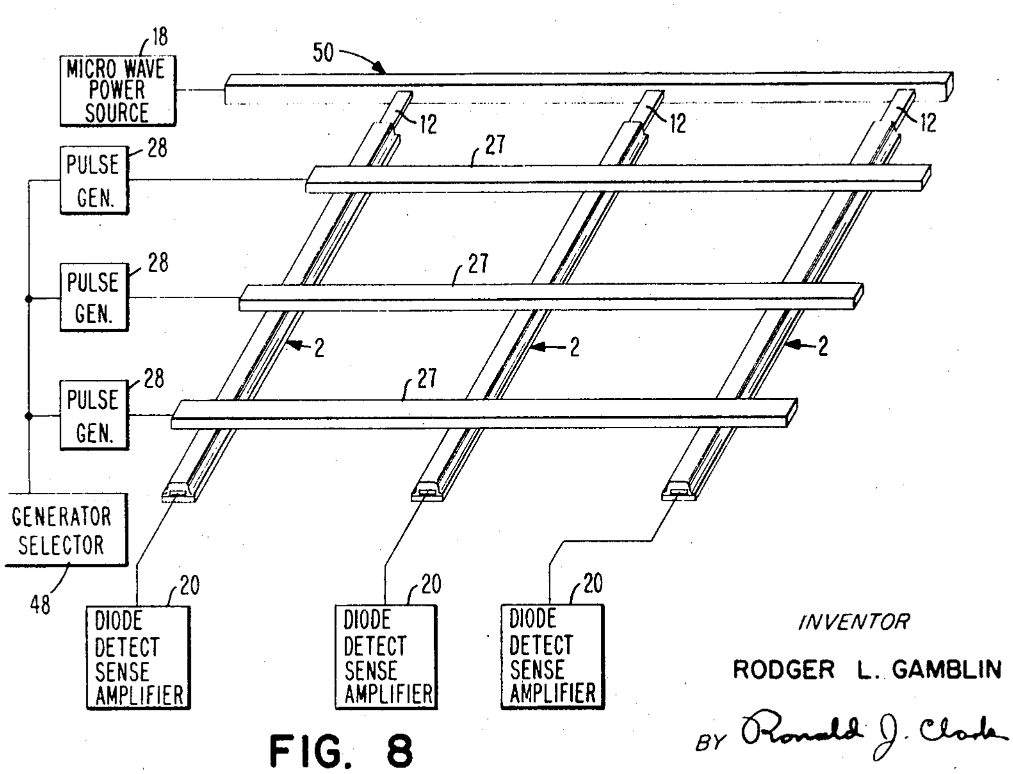
Figure 6A:
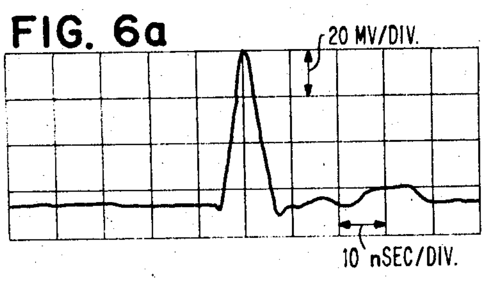
Figure 7A:
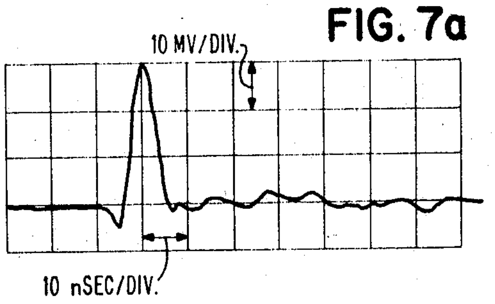
Figure 6B:
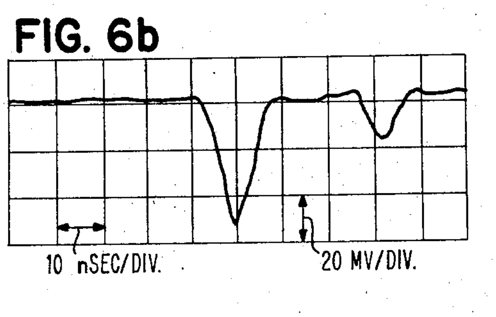
Figure 7B:
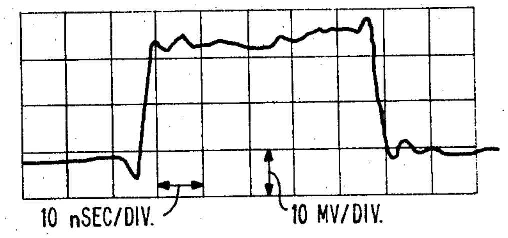

FIGS. 6*a* and 6*b* show the RF signal envelopes for a binary zero and a binary one respectively in response to a selected perturb pulse;

FIGS. 7*a* and 7*b* show the RF signal envelope for a binary one in response to perturber pulses of selected width; and FIG. 8 is a schematic view of a multi-storage element memory constructed according to the principles of the instant invention.

The same numerals are employed to identify corresponding elements shown in the several views.

A device constructed according to the following principles exhibits a plurality of advantages over the devices described in the prior art. Chiefly among these advantages is that the coupled hard axis structure acts as an improved transmission line, that the coupled hard axis structure has an improved impedance level, and that the hard axis structure exhibits an improved signal to noise ratio.

More specifically with relation to the first advantage, the most basic physical principle involved is related to the fact that a transmission line has a finite amount of ohmic resistance and thus attenuates a wave being propagated down the line. The loss per unit length on the line is given by $I^2R$ where I is a current on the line and R is the resistance of the line per unit length. The current I, however, for given power transmission, is determined approximately by the characteristic impedance of the line. The current is inversely proportional to the square root of the characteristic impedance for the given power. If a line which has a considerable amount of resistive loss is loaded with an inductive load, the characteristic impedance increases. Because of this increase the current on the line declines and the loss per unit length decreases as a square of this decline. Since the current decreases as the square root of the impedance of the line, the loss declines inversely to the characteristic impedance. Since the coupled hard axis structure described hereinafter is by its nature inductively loaded, it therefore acts as a better transmission line than a coupled easy axis structure by as much as a factor of ten.

The second important advantage of the coupled hard axis structure involves the practical consideration of the impedance of the device. Transmission lines which are used with thin film structure tend to be wide, but placed close to the ground plane because of the technique used in their manufacture. As a result they have, without any inductive loading, a characteristic impedance of from five to ten ohms. A line with a coupled hard axis film will have an impedance of from twenty to forty ohms due to the inductive loading of the thin film. Almost all circuitry external to the thin film structure itself is naturally of an impedance level near fifty ohms. It is extremely difficult to obtain circuits of five to ten ohms which are efficient and easily made. Therefore, a structure constructed according to the principles of the instant invention is more nearly matched to the circuitry external to the memory device itself.

The third advantage of a coupled hard axis structure arises from the consideration that the coupled film completely encloses the RF conductor lines for the hard axis field. The magnetic field associated with the current in the conductor tends to be concentrated almost wholly within the film so that as the permeability of the film goes imaginary in resonance, a maximum change in the absorption is observed. The signal to noise change for a coupled easy axis or flat film structure is less since any stray field stores energy which is not affected by a change of the resonant property of the film. This effect leads to as much as a factor of two increase in signal to noise ratio for the coupled hard axis structure.

It is further important to note for a microwave absorption system constructed according to the principles of the instant invention that the coupled hard axis structure is in its most satisfactory mode of operation when it is separated from its associated center conductor by a layer of insulation. It has been observed that where the coupled hard axis structure is plated directly on the center conductor the system resonates at a much higher frequency, which is undesirable, with an attendant lower signal to noise ratio.

Figure 1:
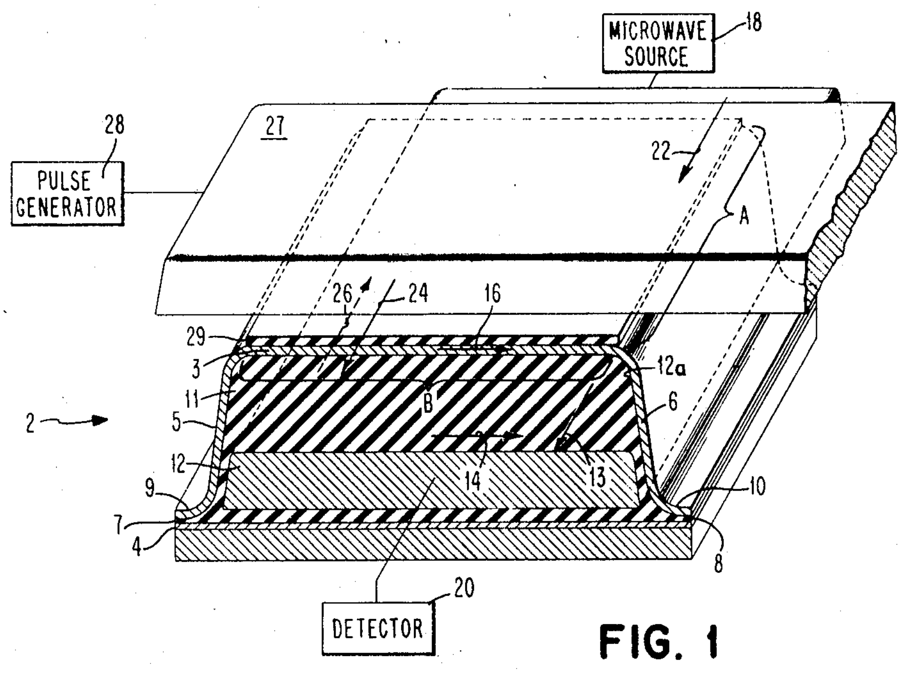

Referring to FIG. 1, there can be seen a sectional view of a single microwave thin film memory structure 2 comprising an upper microwave absorption surface area 3 and a lower microwave absorption surface area 4. A pair of coupling links 5 and 6 provide a means for closing the hard axis of the film element 2, which axis is generated in the memory structure 2 during manufacturing of the element by standard techniques. The resulting structure 2 is a hollow member having considerably greater length A than width B and having a substantially trapezoidal cross section. Slight gaps 7 and 8 are left between the lower ends 9 and 10 of the coupling links 5 and 6, respectively where they approach the closest to the corresponding ends of the lower microwave area 4. This gap is due to difficulties in the plating technique. A completely closed hard axis would operate equally as well. A sense line 12 threads the closed surface or central bore **12*a* generated by the upper and lower absorption areas 3 and 4 respectively and the coupling links 5 and 6 respectively. The sense line 12 is separated from the structure 2 by a layer of insulation 11. The RF signal transmitted down the line 12 is in response to a current flow in the direction of an arrow 13. This current flow generates a magnetic field having a magnetic vector in the direction indicated by an arrow 14 parallel to the hard axis of the absorption structure 2, which hard axis is indicated by an arrow 16. The sense line 12 conducts the RF signals from a microwave source 18 to a diode detector circuit 20. The easy axis of the absorption element 2 lies in the direction indicated by an arrow 22**.

The microwave absorption element 2 is assumed to be in either of two stable states indicated by a first magnetization vector 24 which represents a binary one, and a second magnetization vector 26 which represents a binary zero. A perturb line 27 is positioned relative to the absorption element 2 in such a way as to aid the coaction of a magnetic field, generated in response to a perturber pulse from a pulse generator 28 with the absorption characteristics of the structure 2. As shown in FIG. 1, the selected position is atop the area 3 and separated therefrom by a layer of insulation 29.

Figure 2:
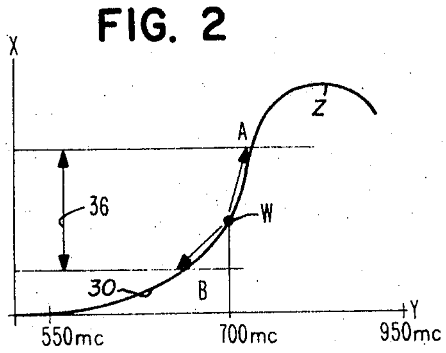
FIG. 2 shows the manner in which the field generated by a word driver changes the operating point of the magnetic field at the intersections of the perturb line and its corresponding bit lines, either upward or downward depending upon the stable state of the film at the time of interrogation.

The theory of operation is best explained with reference to FIG. 2 which shows an absorption operating curve 30 of the structure 2 in response to various frequencies. The microwave power source 18 furnishes energy over a range of frequencies from five hundred fifty megacycles to nine hundred fifty megacycles as shown on the Y axis of FIG. 2. The amount of absorption is shown along the X axis and, the greatest amount occurs at resonance at point Z. An operating point W is established by selecting a frequency of operation at some frequency less than resosance such as seven hundred megacycles. The microwave signal quency of operation at some frequency less than resonance from the source 18 generates a first magnetic field which is perpendicular to the easy axis of the structure 2. Since the frequency of the microwave signal is partially in resonance with the electrons in the thin film structure, the signal is partially absorbed in the film. The current pulse applied to the perturb line 27, generates a second magnetic field which is parallel to the easy axis of the film. This second magnetic field shifts the operating point to point A or B depending on whether the second field is aligned with the stable magnetization vector stored in the film in response to a binary one write-in operation or whether the second field is opposed to the stable magnetization vector stored in the film in response to a binary zero write-in operation respectively. FIG. 6*b* shows the results of an increase in the absorption of the microwave signals. The envelope shown in FIG. 6*b* represents a binary one. FIG. 6*a* shows the results of a decline in the absorption of the microwave signal or a binary zero. A suitable perturb pulse is sixty milliamps and five nanoseconds in duration. The resulting signal picked up by the detector 20 gives a forty to one (40:1) signal to noise ratio. The two levels of absorption give a net difference represented by a line 36 (FIG. 2), which is the difference detected by the detector 20. Other operating curves with other film absorption levels are available over a wide range of frequencies. Experimentation shows that the frequency of seven hundred megacycles gives the best results for this embodiment.

Figure 3:
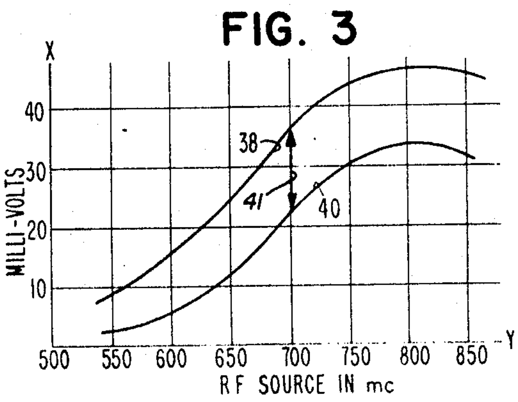
FIG. 3 shows the waveforms of the RF signal envelope associated with a binary 1 and binary 0, respectively, for a selected group of frequencies.

Referring to FIG. 3, there can be seen operating curves 38 and 40 corresponding to a binary one state and binary zero, respectively of the structure 2 for a wide range of frequency between five hundred fifty megacycles and eight hundred fifty megacycles. The X axis represents the amplitude of the microwave signal in millivolts after amplification of sixty db. The Y axis represents the frequency of the RF source in megacycles. A recommended operating frequency is that indicated by the greatest distance between absorption states. In FIG. 3 this is represented by a line 41 at seven hundred megacycles which gives a net signal difference of approximately 15 mv.

Figure 4:
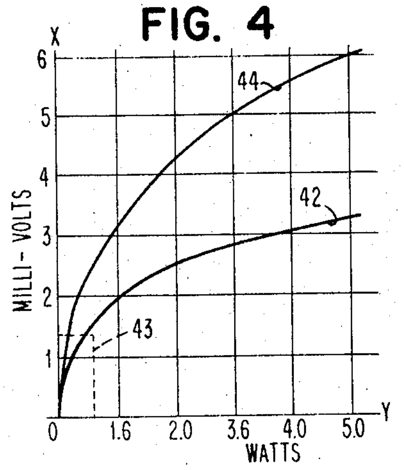
FIG. 4 shows an operating curve of input power vs. output power on the sense line for a selected pair of perturber pulses.

FIG. 4 indicates that the amount of RF power generated by the microwave source 18 can reach a relatively great magnitude without disturbing the stable magnetization state of the absorption structure 2. The X axis gives the output signal in millivolts and, the Y axis gives the RF power in watts. A first curve 42 represents various levels of RF power on the line 12 reaching the detector 20 for a 200 milliamp perturber pulse applied to the perturb line 27. A second curve 44 gives various values of RF power on the line 12 reaching the detector 20 for a 400 milliamp perturber pulse on the line 27. Both of these curves indicate that the RF signal is obtainable for over a range extending to five watts input on the sense line 12. The selected operating range of the microwave source 18 is below the half watt range as indicated by the line 43. The curve shown in FIG. 4 indicates that the microwave absorption structure 2 remains stable even when unintentionally overdriven as sometimes occurs by a circuit failure.

Figure 5:
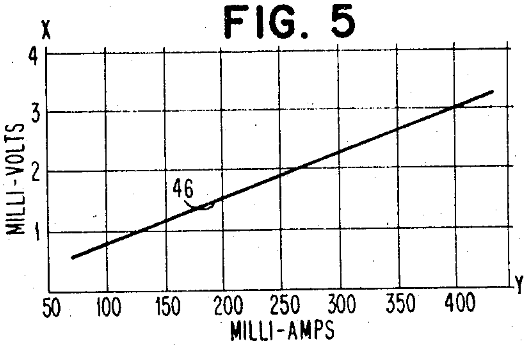
FIG. 5 shows an operating curve of output signal power level vs. perturber current level for a perturber pulse of selected width.

Referring to FIG. 5, there can be seen a curve 46 showing the relationship between the value in milliamps on the Y axis of the perturber pulse applied to the transmission line 27 shown in the FIG. 1, and the output value of an RF microwave signal, on the X axis, reaching the detector 20 when a 20 milliwatt RF signal is propagating down the sense line 12. The perturb pulse is one hundred nanoseconds in duration with a one nanosecond rise and fall time. This particular curve 46 shows that the amplitude of the perturber pulse on the readout line 28 can be increased giving an increased signal arriving at the detector 20, demonstrating that the signal level reaching the detector 20 can be varied independent of the characteristics of the microwave memory structure 2.

Referring to FIGS. 7*a* and 7*b*, there are shown signal traces of the RF signal reaching the detector 20 for various perturber pulses having different time durations. The signal shown in FIG. 7*a* represents the signal received by the detector 20 for a 20 milliwatt RF signal generated by the source 18 when a five nanosecond wide perturber signal is applied to the perturb line 27. The signals shown in FIG. 7*b* represent the same conditions described above except that the perturber pulse is now turned on for fifty nanoseconds. The curves shown in FIGS. 7*a* and 7*b* demonstrate the independent characteristic of the present invention in which a relatively longer signal envelope arrives at the detector 20 in response to a perturber pulse of longer duration applied to the sense line 27.

Referring to FIGS. 6*a* and 6*b*, there are shown the output signal trace received by the detector 20 for an RF signal envelope responding to a five nanosecond wide perturber pulse. FIG. 6*a* represents the RF signal envelope when the magnetization state of the element 2 is representing a binary one. FIG. 6*b* represents the RF signal envelope received by the detector 20 when the element 2 represents a binary zero condition. A sixty-two millivolt difference between states is shown.

Referring to FIG. 8, there can be seen a schematic view of a microwave absorption memory constructed according to the principles of the instant invention. The sense lines 12 which thread each of the structures 2 are connected in common to a main connection line 50 which itself is connected to the microwave power source 18. Well-known engineering techniques are employed for causing each of the sense lines 12 to conduct an equal amount of RF power from the source 18. The coupled hard axis film structures 2 are shown as continuous elements rather than as discrete components. This is possible since the separation between perturb lines 27 is such that the state of magnetization established at the intersection of a perturb line 27 and a sense line 12 does not affect the magnetization state of the next adjacent intersection. The plurality of perturber pulse generators 28 is separately selectable by a decode mechanism, not shown. In this manner a particular word is selected by turning on one pulse generator 28 which interrogates the contents of the microwave absorption elements located at the intersection of that particular perturb line 27 and the plurality of sense lines 12. Each such intersection represents a single bit in the word that is to be read out. An equal plurality of diode detector and sense amplifiers 20 are located at the end of each sense line 12 whereby the entire word is simultaneously available for use throughout an associated device.

A ground plane, not shown, of one to five skin depths of the RF signal employed, is placed between the sense lines 12 and the perturb lines 27 in order to prevent interline coupling. A word read out is achieved by selecting from among the perturb pulse generators 28 by a select circuit 48. The selected generator supplies a perturb pulse to its respective line 27 causing an absorption change at each intersection with a sense line 12. The absorption change of the microwave signal is detected by the plurality of detector and amplifier circuits 20.

While the invention has been particularly shown and described with reference to a preferred embodiment thereof, it will be understood by those skilled in the art that various changes in form and details may be made therein without departing from the spirit and scope of the invention.

What is claimed is:

1. A thin film microwave absorption memory comprising:

a thin film structure having an upper absorption member, a lower absorption member and each of said members being formed with an easy axis and a hard axis;

a first connecting link and a second connecting link integral with said upper surface and depending therefrom in the hard axis direction and terminating slightly spaced from said lower surface for forming a substantially closed structure in said hard axis direction;

a sense line threaded through said closed structure parallel to said easy axis and being formed with a first end and a second end;

a layer of insulation surrounding said sense line and separating said sense line from said structure;

a perturb line positioned above said upper surface and positioned orthogonal to said sense line;

a second layer of insulation intermediate said perturb line and said upper surface;

a microwave source connected to said first end of said sense line as an interrogating signal source;

a microwave detector connected to said second end of said sense line;

said thin film structure having a first magnetic state characterized by a first magnetization vector lying aligned with said easy axis and having a second stable state characterized by a second magnetization vector lying opposed to said first vector, and said interrogating signals being substantially diminished due to an increase in absorption by said thin film structure when said structure is in said first magnetic state and being substantially enhanced due to a decrease in absorption by said thin film structure when said structure is in a second magnetic state.

2. A thin film microwave absorption memory element comprising:

a thin film structure having an upper absorption member, a lower absorption member and each of said member being formed with an easy axis, and a hard axis;

a first connecting link and a second connecting link positioned to close said hard axis of said member upon each other;

a sense line threaded through said closed hard axis structure, parallel to said easy axis and being formed with a first end and a second end;

a signal source connected to said first end for generating a microwave signal;

a microwave detector connected to said second end for sensing the passage of said microwave signal over said sense line and generating an output indicating the amplitude of the sensed signal;

said structure having a first stable state characterized by a first magnetization vector lying parallel to said easy axis and having a second stable state characterized by a second magnetization vector lying anti-parallel to said first vector and having a resonant frequency at which absorption of said microwave signal is maximized;

the frequency of said microwave signal being slightly offset from said resonant frequency;

a pulse generator for generating perturb pulses;

a perturb line coupled to said generator and positioned orthogonal to said sense line;

a perturb pulse on said perturb line being operative for generating a first magnetic field for partially switching said magnetization vector corresponding to a stable state of said structure and for causing a change in the absorption characteristics of said structure.

3. A thin film microwave absorption element as recited in claim 2 and further including:

a first layer of insulation surrounding said sense line and separating said sense line from said structure.

4. A thin film microwave absorption memory matrix comprising:

a plurality of closed, hard axis, thin film structures slightly separated and placed in side-by-side relationship and each of said structures being formed with a bore;

each of said structures having a length considerably longer than its respective width and being formed with an easy axis parallel to its length and a hard axis parallel to its width;

a source of microwaves;

a plurality of sense lines and each of said sense lines having a first end, a second end and being threaded through said bore of each said structure and connected in common to said source by said first end;

a plurality of microwave detectors and each of said detectors being connected to said second end of a respective sense line;

a plurality of perturb lines slightly spaced from each other and each of said lines being positioned orthogonal to said sense lines and extending in close proximity across said structures;

a plurality of pulse generators and each of said generators being connected to a separate perturb line;

a perturb pulse on said perturb line being operative for generating a first magnetic field for partially switching said magnetization vector corresponding to a stable state of said structure and for causing a change in the absorption characteristics of said structure, and means for selecting one of said pulse generators.

References Cited

UNITED STATES PATENTS 3,375,503 3/1968 Bertelsen __________ 340—174

JAMES W. MOFFITT, Primary Examiner

U.S. Cl. X.R.

333—84